United States Patent
Hannah

[11] Patent Number: 5,887,989
[45] Date of Patent: Mar. 30, 1999

[54] LOW COST DIGITAL PRINTER

[75] Inventor: Eric C. Hannah, Pebble Beach, Calif.

[73] Assignee: Intel Corporation, Santa Clara, Calif.

[21] Appl. No.: 612,549

[22] Filed: Mar. 8, 1996

Related U.S. Application Data

[60] Provisional application No. 60/004,431, Nov. 13, 1995 and provisional application No. 60/011,320, Feb. 8, 1996.

[51] Int. Cl.$^6$ ...................................................... B41J 5/30
[52] U.S. Cl. .......................... 400/61; 395/309; 395/114; 395/147; 395/876
[58] Field of Search ................................ 410/61, 76, 17, 410/18; 395/114, 112, 108, 306, 309, 909, 702, 110, 116–117, 147, 876; 347/13, 42; 345/509

[56] References Cited

U.S. PATENT DOCUMENTS

| | | | |
|---|---|---|---|
| 4,377,741 | 3/1983 | Brekka | 347/2 |
| 5,740,338 | 4/1998 | Gauthier et al. | 395/114 |
| 5,796,411 | 8/1998 | Cyman et al. | 395/101 |
| 5,796,930 | 8/1998 | Gauthier et al. | 395/116 |
| 5,808,285 | 9/1998 | Rockstein et al. | 235/472.01 |

FOREIGN PATENT DOCUMENTS 163966  9/1984  Japan .................................. 400/120.02

OTHER PUBLICATIONS

Universal Serial Bus Specification Revision 1.0, Jan. 15, 1996. Compaq, Digital Equipment Corporation, IBM PC Company, Intel, Microsoft, NEC, Northern Telecom.

IEEE Draft Standard for a High Performance Serial Bus, P1394, D8.0v2, Jul. 1995, DS3285. Institute of Electrical and Electronics Engineers, Inc.

*Primary Examiner*—Eugene Eickholt
*Attorney, Agent, or Firm*—William H. Murray; N. Stephan Kinsella

[57] ABSTRACT

A printer for printing an image onto a physical medium. The printer includes a print engine for physically printing the image onto the physical medium. The print engine receives signals representing the image to be printed directly from an external computer. The printer is coupleable to the external computer by a high-speed serial bus that enables the printer to print the images without prior interim storage of the signals in an on-board buffer in the printer. The signals may be processed by a processor in the external computer before being transmitted to the print engine, thereby eliminating a need for an on-board processor in the printer.

20 Claims, 4 Drawing Sheets

LOW COST DIGITAL PRINTER

CROSS-REFERENCES TO RELATED APPLICATIONS

This non-provisional U.S. national application, filed under 35 U.S.C. §111(a) claims, under 35 U.S.C. §119(e)(1), the benefit of the filing date of provisional U.S. application Ser. No. 60/006,431, filed under 35 U.S.C. §111(b) on Nov. 13, 1995, and of the provisional application filed under 35 U.S.C. §111(b) on Feb. 8, 1996, assigned U.S. application Ser. No. 60/011,320, both being incorporated herein by reference.

BACKGROUND OF THE INVENTION

1. Field of the Invention

This invention relates to the field of printers capable of printing text and/or graphics onto a physical medium.

2. Description of the Related Art

Digital printers typically are used to translate, and print onto a physical medium, such as paper, a text or graphics image represented by a digital signal in a computer. The digital signal concurrently may be being displayed on a video monitor coupled to the computer and typically is resident in computer memory. Typically, a computer user initiates a command for the digital signal to be transmitted over a data bus from the computer to the printer for printing.

The mechanism in a printer responsible for actually printing characters and graphics is called a print engine. Printers have different types of print engines which determine the way in which they print characters onto a physical medium. Print engines, and thus printers, can be grouped into five main types: dot-matrix, thermal, character, ink-jet, and laser. For example, a dot-matrix printer forms characters on a page by striking the paper through an inked ribbon with a series of wires. As the print head passes across the page, various ones of the wires are energized and thrust forward to impact the paper through the inked ribbon, leaving various patterns of dots on the paper.

Thermal printers use heat to form dots on paper. Instead of driving a wire forward, the electrical current in the print head in a thermal printer heats a dot element which is in contact with a special heat-sensitive paper. When the paper is heated by the dot element of the head, it turns dark in the spot or spots that were heated.

Character printers include a die which has fully formed characters molded into the head. The particular character desired is made to strike the paper through an inked ribbon.

Ink-jet printers paint the characters onto the page with liquid ink. Finally, laser printers, which can produce ultra-high density matrix graphics, print using a laser beam. Laser printers include a photosensitive drum. When laser light strikes this drum, it causes changes in the drums surface characteristics in those places struck by light, typically by generating a positive or negative charge in those regions struck. The drum continues rolling to pick up toner which typically has an electrical charge opposite in polarity to that imparted to the drum by the laser. As the drum continues to rotate, paper is fed along the drum path and the drum transfers the toner to the paper. The toner is then melted into the paper using a heat lamp to produce the permanent text and/or graphics on the paper.

Referring now to FIGS. 1 and 2, a conventional printer 10 typically includes control processor 11, read-only memory (ROM) 13 and data and command buffers 15. Printer 10 is coupled to computer 20 over bi-directional data bus 16. Conventional computers, such as computer 20, typically include memory 22 and processor 24. Computer 20 is coupled to video monitor 26 for display of text and graphics.

A functional block diagram of printer 10 is shown in FIG. 2. Digital signals representing text or graphics generated by and/or stored in computer 20 are sent to printer 10 over bus 16 for printing. The digital signals may be displayed as an image on video monitor 26 enabling a user of computer 20 to view the image before it is printed. Typically, the digital signals representing the image are stored in memory 22 of computer 20.

Generally, when a print command is issued, for example by a user of computer 20, a digital signal representation of a text and or graphics image to be printed (data signal) and a series of command characters are transmitted from computer 20 over bus 16 to printer 10. The command characters are interpreted by control processor 11 of printer 10 and instruct printer 10 where and how to print the text and graphics image and include, for example, instructions concerning font type, which affects character style, point size, which affects character size, spacing and the like. The data signals and command characters enter the printer and typically are stored in a memory buffer, such as input/output (I/O) buffer 15.1 which is part of a series of buffers comprising data and command buffers 15.

While in I/O buffer 15.1, control processor 11 of printer 10 analyzes the stored information to separate the command characters from the data signals. Both the data signals and command characters typically are then moved into page intermediate buffer 15.2 of data and command buffers 15.

Control processor 11 then executes the instructions denoted by the command characters stored in page intermediate buffer 15.2, typically in conjunction with processing software stored in ROM 13. Control processor 11 also sorts the data signals to ensure correct orientation of the printed text or graphics image on the printed page. Preferably, control processor 11 converts any graphics data signals stored in page intermediate buffer 15.2 into a bit-mapped format. Graphics data signals, especially color graphics data signals, stored in bit-map format require significant amounts of memory, and typically limit the size and quality of the graphics that may be printed by conventional printers.

Digital signals representing graphics and text images remain in page intermediate buffer 15.2 until the buffer accumulates a complete page of data signals to be printed, at which point the bit-mapped graphics and text data signals are intermittently moved into another element of data and command buffer 15, such as strip buffers 15.3. Data in strip buffers 15.3 can be called print head signals since they directly translate into the images printed by print engine 17. Control processor 11 arranges signals in the strip buffers 15.3 into sequential horizontal lines for printing. The data signals representing text typically are first converted into an appropriate bit-mapped image in accordance with the command characters. The bit-mapped text images typically are pre-stored in printer memory, such as in ROM 13. ROM 13 can include one or more plug-in memory cards, for example to provide greater selection of character sizes and font styles.

Certain embodiments of conventional printers do not include pre-stored bit-mapped text images, but instead use software resident in printer memory, such as ROM 13, run by control processor 11 to generate the various text point sizes and font styles, for example according to instructions provided by the command characters.

Regardless of the origin of the bit-mapped image ready for printing, horizontal strips of it are transmitted to one of the buffers in strip buffers 15.3 to provide print head signals. Once a strip buffer is filled, for example with print head signals, which typically represent a plurality of pixels or dots of an image, its contents are transmitted to print engine 17 for printing onto a physical medium such as paper.

When a strip buffer is emptied, it receives new data from page intermediate buffer 15.2. Typically, while one strip buffer is being emptied, for example as it provides print head signals to the print engine, one or more other strip buffers are being filled, or have been filled and are waiting to be emptied. The strip buffers 15.3 permit the printer to prepare data for printing independently of the speed with which the print engine is operating and provide for immediate access to print head signals by print engine 17 on an as-needed basis. If the preparation process exceeds the print process, it can be halted or slowed by control processor 11. However, if the speed of the print process greatly exceeds that of the preparation process such that all strip buffers 15.3 have been emptied, an error typically will occur. This illustrates the importance of the timely provision of print head signals to the print engine.

Control processor 11 in conjunction with software stored, for example, in ROM 13, further is capable of manipulating digital image signals from computer 20 prior to printing, for example to improve image quality. For example, control processor 11 can perform image enhancement on the digital signal representing the image on, for example, video monitor 26. Control processor 11 also might decompress a digital image signal transmitted from computer 20, for example, representing a complex graphics image or the like.

It is evident, therefore, that real-time printing in conventional printers depends on the timely provision of print head signals to the print engine, such as is provided by strip buffers 15.3 in conventional printers. Strip buffers 15.3 must be instantly accessible by the print engine when the print engine is ready to accept data and print. In a conventional printer coupled to a computer through a conventional bus, direct coupling of print-head signals from the computer to the print engine would inhibit real-time printing because the relatively high latency and low bandwidth of bus 16 limits the amount of real-time data transfer to the print engine. In essence, digital image signals generally would not be instantly accessible by the print engine in real-time. This is especially true where the digital image signal to be printed represents complex or color graphics.

SUMMARY OF THE INVENTION

Briefly, in accordance with one embodiment of the invention, a printer for printing an image onto a physical medium. The printer includes a print engine for physically printing the image onto the physical medium. The print engine receives signals representing the image to be printed directly from an external computer. The printer is coupleable to the computer by a high-speed serial bus that enables the printer to print the images without prior interim storage of the signals in an on-board buffer in the printer. The signals may be processed by a processor in the external computer before being transmitted to the print engine, thereby eliminating a need for an on-board processor in the printer.

BRIEF DESCRIPTION OF THE DRAWINGS

The following detailed description will be more fully understood with reference to the accompanying drawings in which.

DETAILED DESCRIPTION OF THE PREFERRED EMBODIMENT

Figure 1:
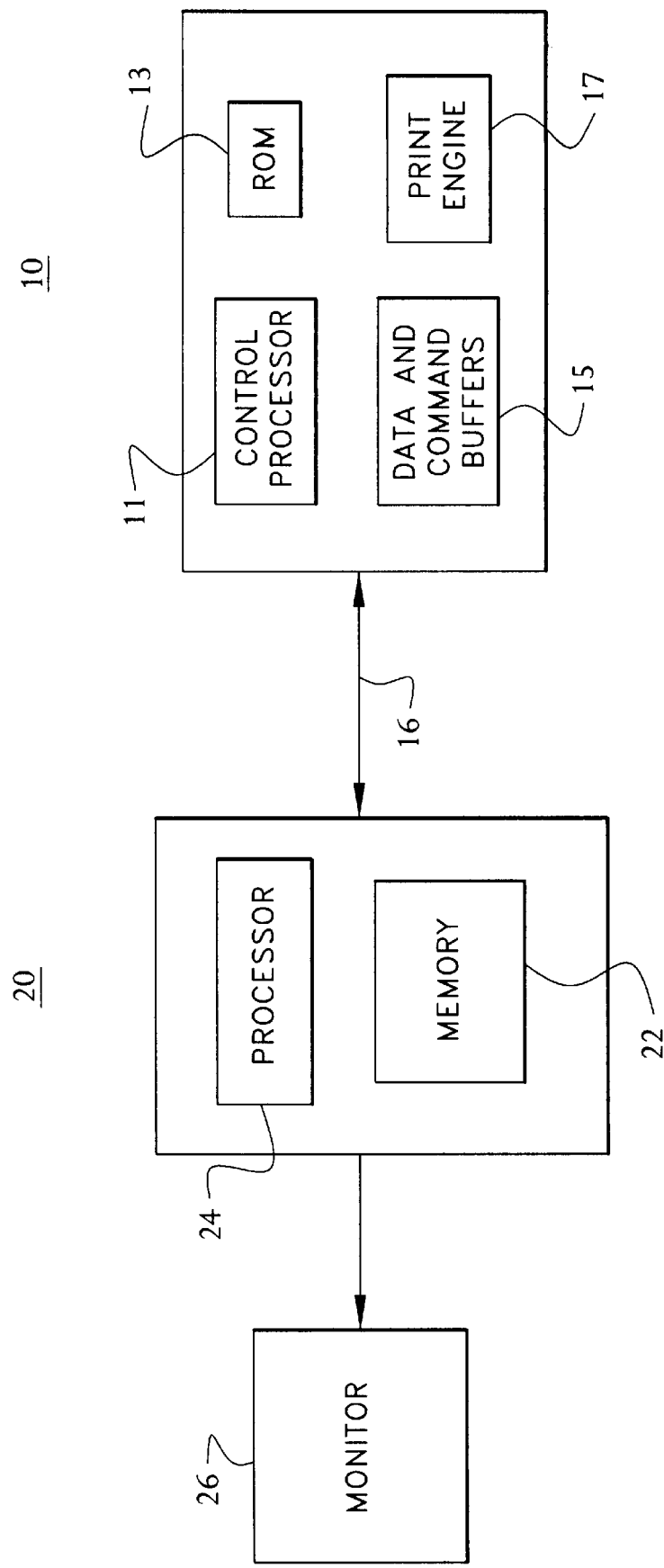
FIG. 1 is a block diagram of a conventional printer coupled to a computer using a conventional bus.
Figure 2:
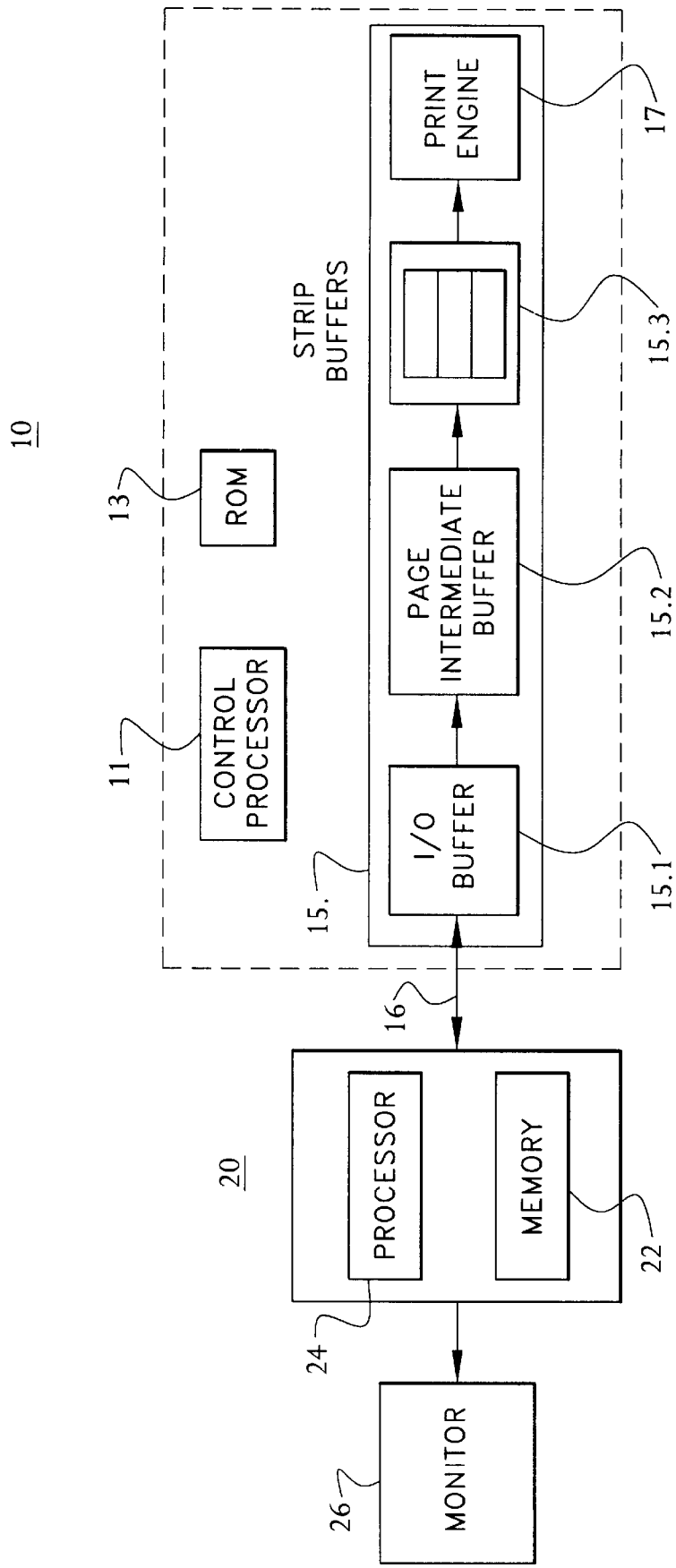
FIG. 2 is a functional block diagram of FIG. 1.
Figure 3:
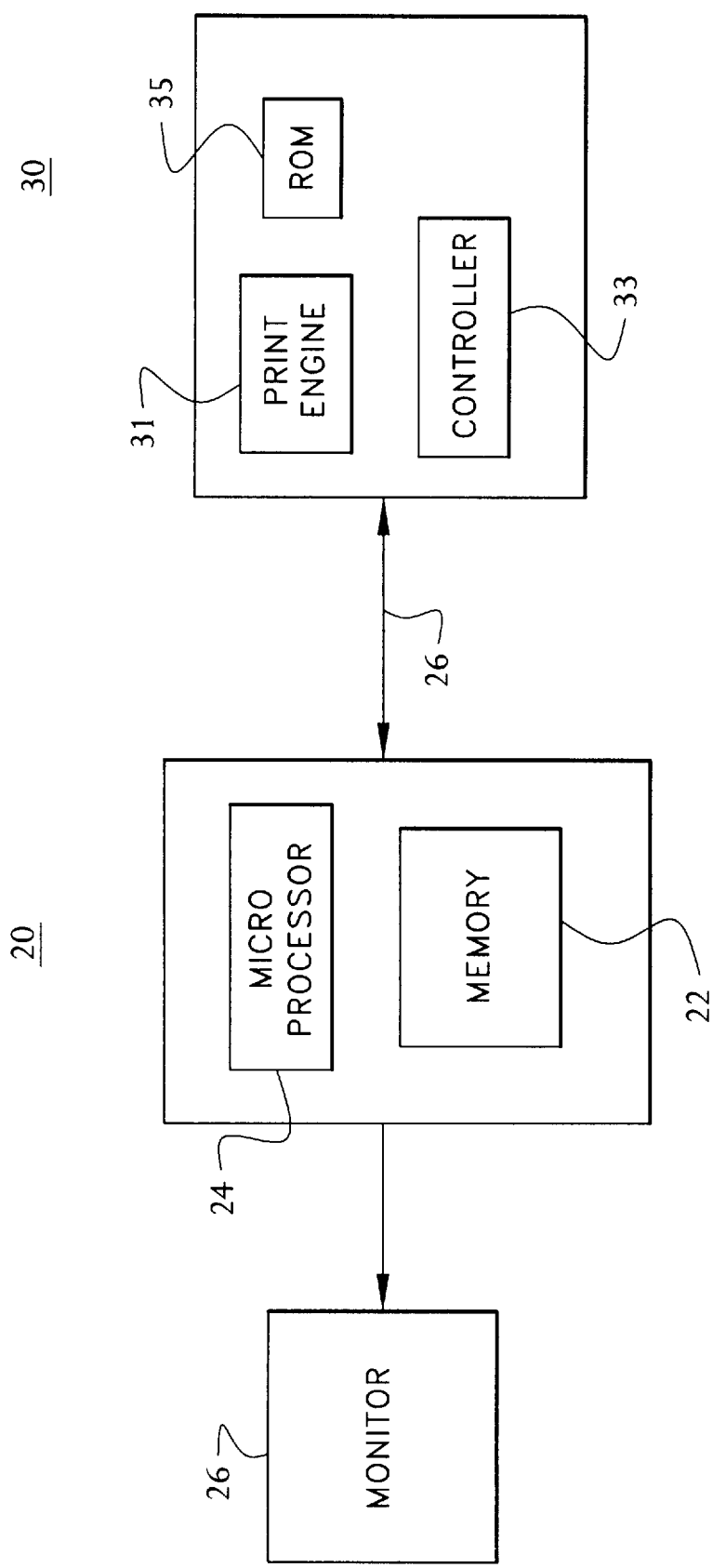
FIG. 3 is a block diagram of an embodiment of a printer in accordance with the invention coupled to a computer using a high-speed serial bus.
Figure 4:
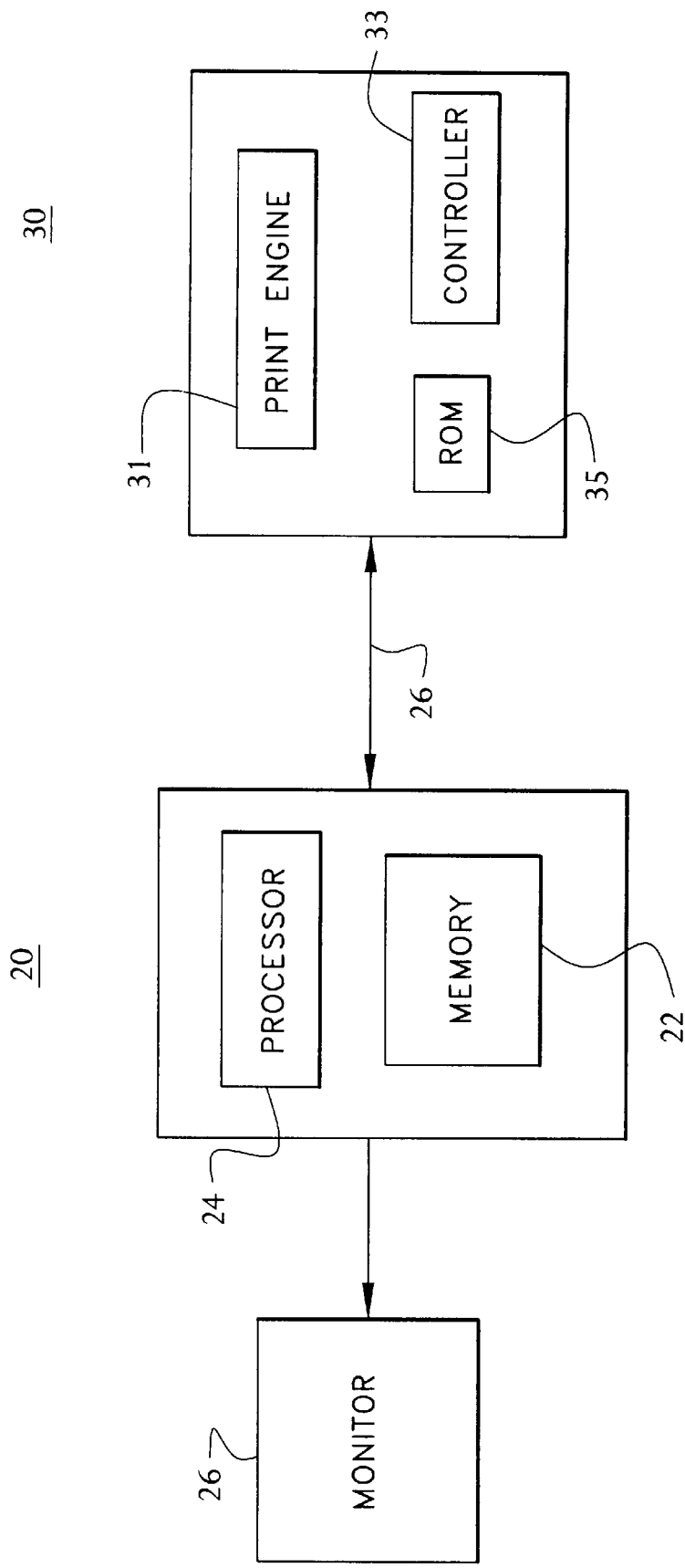
FIG. 4 is a functional block diagram of FIG. 3.

Referring to FIGS. 3 and 4, a substantial cost reduction in digital printers is possible through the use of a new high-speed bus which provides low latency and high bandwidth. A bus of this type is disclosed in U.S. Provisional Application Ser. No. 60/006,431, filed Nov. 10, 1995, and U.S. Provisional Application Ser. No. 60/011,320 filed on Feb. 8, 1996, each being incorporated herein by reference.

In this particular embodiment, printer 30 has print engine 31 for physically printing an image represented by a digital image signal. The digital image signal may represent text, graphics or a combination of both.

Printer 30 is coupled to computer 20 through high speed serial bus 26. Bus 26 permits high-speed data transfer between printer 30 and computer 20, e g., at a rate of around 800 Megabits per second (Mbits/sec). Bus 26 further has a low latency, thereby enabling substantially immediate access of bus 26 by computer 20 for data transfer to, for example, printer 30. It will, of course, be appreciated that the scope of the invention is not limited to this particular embodiment.

Bus 26, having a relatively high bandwidth and low latency, can transmit digital image signals essentially at a real time rate, i.e., immediately upon issuance of a print command by, for example, a user of computer 20 and in any event as needed by print engine 31. Bus 26 therefore permits real time printing of digital image signals which typically are stored in computer memory 22 and might be being displayed on video monitor 26, and reduces the need for any internal buffers in printer 30, such as data and command buffers 15 in conventional printer 10.

Printer 20 thus can be constructed without any on-board interim storage devices, such as on-board data and command buffers 15 required in conventional scanner 10. In an embodiment, processor 24 of computer 20 processes the digital image signals before transmitting them directly to print engine 31. Print engine 31 of printer 30 therefore receives digital image signals ready for printing directly from computer 20 at a rate sufficient to support high resolution printing in real-time, without the conventional requirement that on-board buffers hold the digital image data for substantially immediate access as needed by print engine 31. Manufacturing costs are kept down, since printer 30 can be constructed without or with fewer relatively expensive memory devices.

As noted, the relatively high bandwidth and low latency of bus 26 enables transmission of high-resolution digital signals which might have been processed by microprocessor 24 of computer 20 directly to print engine 31 for printing in real-time. In fact, an elimination of on-board buffers from printer 30 essentially requires such processing by microprocessor 24, since print head signals are being sent directly from computer 20 to print engine 31, thereby removing any opportunity for on-board processing of the signals by printer 30. Processor 24 thus is advantageously employed to perform imaging processing on the digital image signals, in lieu of on-board processing in the printer, such as is typically performed by control processor 11 in printer 10. Accordingly, printer 10 can be manufactured without internal dedicated processing hardware and software, as is known in conventional printers, further suppressing manufacturing costs for printer 30 in comparison with conventional digital printers. Of course relatively crude processing devices, such as controller 33 and software in ROM 35 may remain to monitor and control the printer's operability, such as by running diagnostic routines and self-tests.

On-board processors, such as control processor 11 in printer 10, typically use fixed algorithms stored in ROM 13 for image enhancement, generation of print head signals such as bit-maps, and decompression, thereby precluding any ability to vary or customize the extent and quality of enhancement, resolution, character size or font style of the printed images beyond what has been pre-programmed. Furthermore, the need for maintaining conventional printer costs within a reasonable ceiling necessarily limits the complexity of, for example, control processor 11, the amount of ROM 13 and correspondingly, the quantity of software stored in ROM 13, consequently limiting the sophistication, amount and types of image processing and print head signal preparation routines which may be run on the digital image signals. The large storage capacity of memory associated with a host computer, such as memory 22 of computer 20, and powerful processing capabilities of processor 24 of computer 20 (which capabilities continue to rapidly advance) enable running of plural and/or complex decompression, image processing and enhancement and print head signal generation applications on the digital image signals to be printed by printer 30. Various and complex bit-map patterns, font styles and point sizes may be stored in and generated by computer 20 for printing by printer 30. Computer 20 is able through high-speed serial bus 26 to transmit signals directly to print engine 31 of printer 30 in accordance with the need of print engine 31 to be timely supplied in real-time with such signals. Signals to be printed by printer 30, therefore, are preferably processed by and/or originate with the powerful and flexible computing capabilities of, for example, processor 24 of computer 20, rather than with a printer's less capable internal hardware and software combinations.

Printer 30 represents a significant improvement over conventional printer technology. Substantial cost savings can be realized by the elimination or reduction of on-board hardware, such as control processors and buffers. Furthermore, image quality and resolution improvements, and the quantity of available character types and styles, no longer are dependent on expensive improvements or upgrades of printer hardware and software but essentially are wholly reliant on improvements to, for example, computer processor 24. Significantly, computer processor technology continues to rapidly advance, and as it does, so will improvements to the quality of the printed images generated by printer 30.

It should be understood that various changes in the details, materials, and arrangements of the parts which have been described and illustrated in order to explain the nature of this invention may be made by those skilled in the art without departing from the principle and scope of the invention as expressed in the following claims.

What I claim is:

1. A printer for printing an image onto a physical medium, comprising:
   (a) a print engine, wherein:
      the print engine physically prints the image on the physical medium with a print head in accordance with a plurality of print head signals that represents the image;
      the print engine is capable of receiving said print head signals representing the image to be printed directly from an external computer;
      the printer is coupleable to the external computer by a high-speed serial bus having a bandwidth of at least 750 Megabits per second that enables the computer to provide the print head signals to the print engine in real-time when the print engine is ready to accept the print head signals for printing, whereby the printer is enabled to print the image without prior interim storage of the print head signals in an on-board strip buffer in the printer;
      the external computer has a processor capable of processing and generating the print head signals and the print engine is capable of printing the image without prior on-board processing of the signals in the printer; and
      the processor is capable of processing the print head signals in real-time and the print engine is capable of receiving the print head signals from the processor over the high-speed serial bus in real-time.

2. The printer of claim 1, wherein the bandwidth of the high-speed serial bus is high enough and the latency low enough to transmit the signals to the print engine at a rate required by the print engine.

3. The printer of claim 1, wherein the image comprises text and the processor can perform at least one of character size and character style manipulation.

4. The printer of claim 1, wherein the image comprises graphics and the external processor can perform at least one of decompression and image enhancement.

5. The printer of claim 1, wherein the external computer is coupleable to a video monitor and the image is displayable on the video monitor.

6. The printer of claim 1, wherein the external computer comprises memory, wherein the signals are storable in the memory.

7. The printer of claim 1, wherein the processor is capable of processing the print head signals at a rate required by the print engine and the bandwidth of the high-speed serial bus is high enough and the latency low enough to transmit the print head signals at the rate required by the print engine;
   the image comprises at least one of text and graphics and the processor can perform at least one of character size manipulation, character style manipulation, decompression and image enhancement; and
   the external computer comprises memory in which the print head signals are storable and is coupleable to a video monitor on which the image is displayable.

8. A printer for printing an image onto a physical medium, comprising:
   (a) means for printing, wherein:
      the means for printing physically prints the image onto the physical medium with a print head in accordance with a plurality of print head signals that represents the image;
      the means for printing is capable of receiving said print head signals representing the image to be printed directly from an external means for computing;
      the printer is coupleable to the external computer by a high-speed serial bus having a bandwidth of at least 750 Megabits per second that enables the computer to provide the print head signals to the print engine in real-time when the print engine is ready to accept the print head signals for printing, whereby the printer is enabled to print the image without prior interim storage of the print head signals in an on-board strip buffer in the printer;

the external computer has a processor capable of processing and generating the print head signals and the print engine is capable of printing the image without prior on-board processing of the signals in the printer; and the processor is capable of processing the signals in real time and the print engine is capable of receiving the signals from the processor over the high-speed serial bus in real-time.

9. The printer of claim 8, wherein the high-speed means for signal transfer has a bandwidth high enough and a latency low enough to transmit the signals to the means for printing at a rate required by the means for printing.

10. The printer of claim 8, wherein the image comprises text and the means for processing can perform at least one of character size and character style manipulation.

11. The printer of claim 8, wherein the image comprises graphics and the means for processing can perform at least one of decompression and image enhancement.

12. The printer of claim 8, wherein the external means for computing is coupleable to a means for display and the image is displayable on the means for display.

13. The printer of claim 8, wherein the external means for computing comprises means for storage, wherein the signals are storable in the means for storage.

14. The printer of claim 8, wherein:

the means for processing is capable of processing the signals at a rate required by the means for printing and the high-speed means for signal transfer has a bandwidth high enough and a latency low enough to transmit the signals at the rate required by the means for printing;

the image comprises at least one of text and graphics and the means for processing can perform at least one of character size manipulation, character style manipulation, decompression and image enhancement; and the external means for computing comprises means for storage in which the signals are storable and is coupleable to a means for display in which the image is displayable.

15. A method for printing an image onto a physical medium, comprising the steps of:

(a) transmitting from an external computer a plurality of digital print head signals representing the image over a high-speed serial bus to a print engine of a printer in real time;

(b) printing the image on the physical medium with the print head in accordance with the digital print head signals without storing the digital print head signals in a strip buffer in the printer and without locally processing the digital printer head signals, wherein the high-speed serial bus has a bandwidth of at least 750 MHz which is high enough and has a latency low enough to enable the computer to provide the print head signals to the print engine in real-time when the print engine is ready to accept the print head signals for printing; and (c) processing the digital signals in an external means for processing before transmitting the digital signals to the print engine.

16. The method of claim 15, wherein the image comprises text and the step of processing comprises at least one of:

(1) character size manipulation; and (2) character style manipulation.

17. The method of claim 15, wherein the image comprises graphics and the step of processing comprises at least one of:

(1) decompressing the digital signal; and (2) enhancing the image represented by the digital signal.

18. The method of claim 15, wherein the external means for processing is comprised in a computer, wherein the computer is coupled to a display means, wherein the image is displayable on the display means.

19. The method of claim 15, wherein the external means for processing is comprised in a computer, the computer further comprising computer storage means, wherein the digital signal is storable in the computer storage means.

20. The method of claim 15, further comprising the step of processing the digital signals in an external means for processing before transmitting the digital signals to the print engine, wherein:

the high speed bus has a bandwidth high enough and a latency low enough to enable transmission of the digital signals at a rate required by the print engine and step (a) further comprises the step of transmitting the digital signals to the print engine at a rate required by the print engine;

the image comprises at least one of text and graphic and the step of processing comprises at least one of character size manipulation, character style manipulation, decompressing the digital signal and enhancing the image represented by the digital signal; and the external means for processing is comprised in a computer which is coupled to a display means and the image is displayable on the display means and the computer comprises storage means in which the digital signal is storable.

* * * * *